United States Patent [19]

Kadlec et al.

[11] Patent Number: 4,766,355
[45] Date of Patent: Aug. 23, 1988

[54] AUTOMATIC VERTICAL SIZE CONTROL

[75] Inventors: Joseph Kadlec, Berwyn; Kenneth W. Kociolek, Des Plaines; Thaddeus P. Okrzesik, Chicago, all of Ill.

[73] Assignee: Zenith Electronics Corporation, Glenview, Ill.

[21] Appl. No.: 101,036

[22] Filed: Sep. 25, 1987

[51] Int. Cl.[4] .................... H01J 29/70; H04N 5/68; N04N 5/04
[52] U.S. Cl. .................................... 315/399; 358/242; 358/148
[58] Field of Search ................ 315/399; 358/148, 150, 358/158, 242

[56] References Cited

U.S. PATENT DOCUMENTS 4,679,091 7/1987 Kikuchi et al. ..................... 358/148

Primary Examiner—Theodore M. Blum
Assistant Examiner—Gregory C. Issing

[57] ABSTRACT

An automatic vertical display change circuit for a monitor includes a transistor that is operated in response to a mode signal for determining the amplitude of the vertical ramp produced by the vertical oscillator. The transistor is driven conductive to load the voltage supply means for the oscillator and reduce the operating voltage therefor to decrease the vertical ramp amplitude.

4 Claims, 1 Drawing Sheet

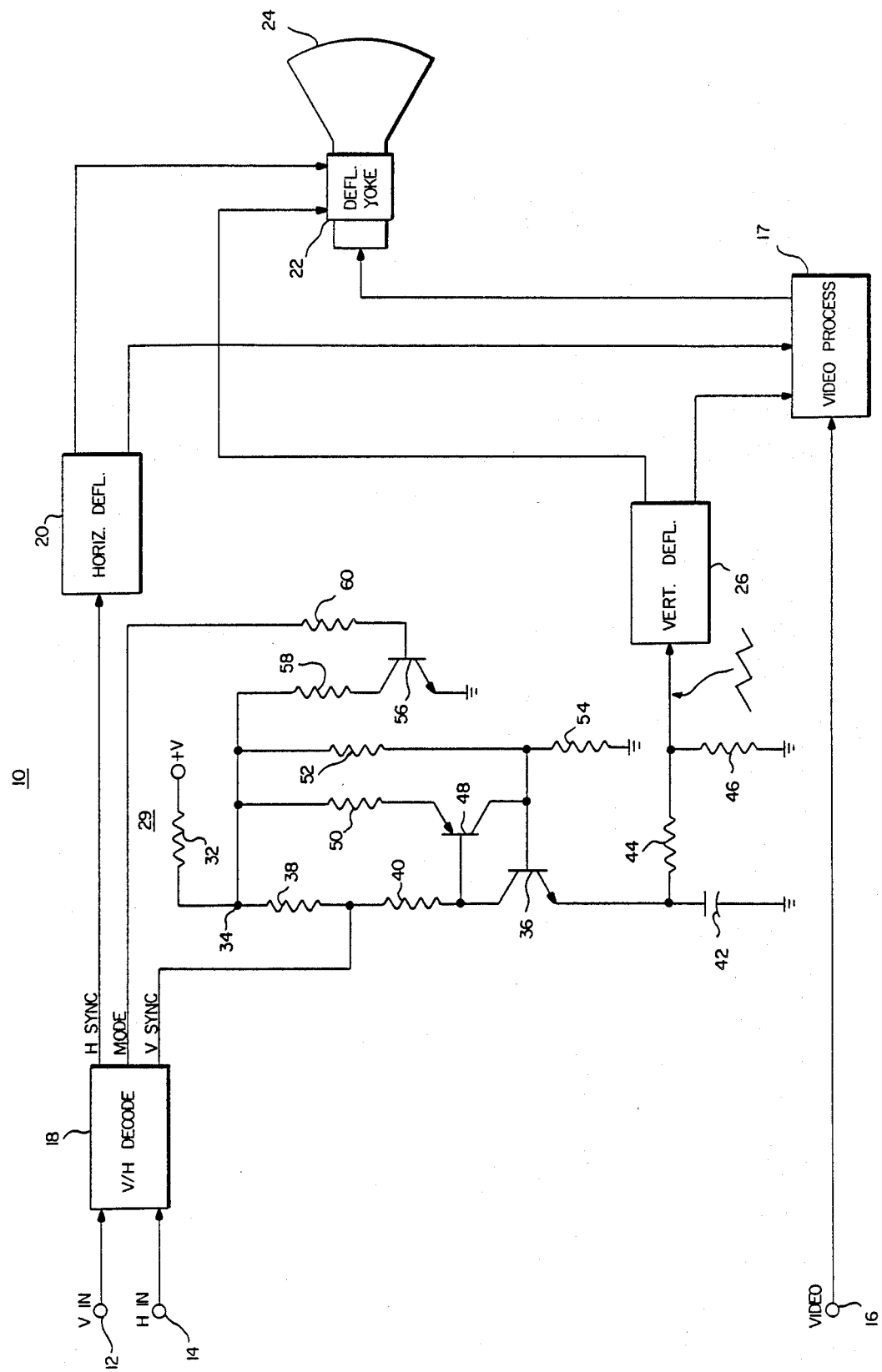

AUTOMATIC VERTICAL SIZE CONTROL

BACKGROUND OF THE INVENTION AND PRIOR ART

This invention relates generally to cathode ray tube (CRT) monitors and specifically to monitors that have different operating modes in which the vertical resolution is changed.

Monitors embody CRT display devices and horizontal and vertical deflection systems for scanning the electron beam in the CRT across its phosphor target or faceplate to produce a raster. They also include video processing means for processing input video information for display on the CRT. With alpha-numeric displays, a higher degree of resolution is desirable. In response to this need, monitors having the capability of more than one vertical resolution, as well as different horizontal scan rates, are now available. Such monitors must be able to respond to the particular type of display for which the input video information is formatted. The display or format is encoded by the polarities of the incoming vertical and horizontal sync signal information that is supplied with the video data. The monitor must be able to decode that information to establish the correct operating mode and to develop horizontal and vertical sync pulses of correct polarity for the deflection circuits in the monitor.

The present invention is directed to a simple, low cost automatic vertical size control mechanism. The different vertical modes are defined by vertical resolutions of 400 lines and 480 lines. The 400 line resolution screen is obtained ty increasing the vertical size or sweep voltage (effectively overscanning the CRT) and only displaying 400 lines on the CRT.

OBJECTS OF THE INVENTION

A principal object of the invention is to provide a novel display circuit for a monitor.

Another object of the invention is to provide an economical two mode vertical display for a monitor.

BRIEF DESCRIPTION OF THE DRAWING

These and other objects and advantages of the invention will be apparent upon reading the following description in conjunction with the drawing, the single FIGURE of which is a partial schematic diagram of a monitor incorporating the invention.

DESCRIPTION OF THE PREFERRED EMBODIMENT

A monitor constructed in accordance with the invention is generally designated by the reference numeral 10. It includes three input terminals 12, 14 and 16 for vertical, horizontal and video information, respectively. The vertical and horizontal information may be in the form of sync signals of either polarity, with the polarity combination of the respective sync signals indicating the format of the video information, i.e., the horizontal frequency, and vertical resolution. Terminals 12 and 14 are connected to a V/H decode circuit 18 which includes means for decoding the combination of horizontal and vertical information polarities to develop a mode signal and to also produce horizontal and vertical pulses of the polarities required by the monitor. A system for decoding the encoded horizontal and vertical sync information may be found in copending application Ser. No. 070,999 entitled VIDEO MONITOR USING EN-CODED SYNC SIGNALS filed 7/8/87 in the names of A. Sheikholeslami and G. Turro and assigned to Zenith Electronics Corporation, which application is incorporated by reference herein.

One output of V/H decode circuit 18 comprises a horizontal sync pulse signal. This signal is applied to a horizontal deflection circuit 20 which, in turn, supplies appropriate deflection currents to horizontal windings (not shown) in a deflection yoke 22 that is positioned on the neck of a CRT 24. A mode signal and a vertical sync pulse signal are also provided as outputs from V/H decode circuit 18, as will be described. The video input signal present at input terminal 16 is coupled to a video processing circuit 17 which supplies video information to the electron gun structure (not shown) in CRT 24. Video processing circuit 17 has a pair of other inputs, one from horizontal deflection circuit 20 and another from a vertical deflection circuit 26, which together provide horizontal and vertical blanking of the video signal processed by video processing circuit 17. Vertical deflection circuit 26 provides appropriate deflection currents to a vertical deflection winding (not shown) in deflection yoke 22.

A vertical oscillator and size control circuit is generally designated by the reference numeral 29. A pair of oscillator transistors, specifically an NPN transistor 36 and a PNP transistor 48 have their respective bases and collectors interconnected as shown. The collector of transistor 36 is connected to a source of +V voltage through a series string of resistors 32, 38 and 40 and its emitter is connected to ground through a charging capacitor 42. A pair of resistors 44 and 46 provide a discharge path for capacitor 42. The charging resistor for capacitor 42 comprises a resistor 50 which is connected between resistor 32 and the emitter of transistor 48. The junction of resistor 32 and resistor 50 comprises a reference terminal 34. A voltage divider consisting of series-connected resistors 52 and 54 is established between terminal 34 and ground with the junction of the voltage divider being connected to the base of transistor 36 and to the collector of transistor 48. This arrangement of elements is well-known and comprises a standard vertical oscillator circuit that "free runs" within a frequency range determined by the values of the components to produce a ramp having a magnitude that is essentially dependent upon the voltage level at reference terminal 34. The oscillator is synchronized by virtue of the connection of the junction of resistors 38 and 40 to the vertical sync pulse signal output of V/H decode circuit 18.

Vertical size control is obtained by changing the voltage level of reference junction 34. This is accomplished by a loading circuit comprising a resistor 58 connected in the emitter collector path of a switch transistor 56. Specifically, the collector of switch transistor 56 is connected to resistor 58 which in turn is connected to reference junction 34. The emitter of switch transistor 56 is connected to ground. The base of switch transistor 56 is connected, through a resistor 60, to the mode signal output of V/H decode circuit 18. With the NPN switch transistor 56 shown, a positive mode signal at the base of switch transistor 56 will drive it conductive and cause current flow through resistor 58 and resistor 32. The additional current flow through resistor 32 increases the voltage drop thereacross and reduces the voltage level of reference junction 34. This reduction in voltage causes a decrease in the amplitude of the vertical ramp voltage produced at the junction of resistors 44 and 46. Therefore, a ramp voltage of smaller magnitude is supplied to vertical deflection circuit 26, which decreases the size of the vertical deflection signal, and produces a smaller vertical raster. The smaller vertical sweep size corresponds to the 480 line resolution mode. When the mode signal is low, switch transistor 56 does not conduct and the level of reference terminal 34 is normal, that is, it is higher than in the previous condition. Thus the vertical ramp voltage has a greater magnitude and the vertical size of the raster on CRT 24 is correspondingly larger. As mentioned, the raster is significantly overscanned vertically such that only 400 lines of vertical information are reproduced on the display, the dimensions of which are held constant.

It will be seen that the vertical size change which corresponds to the vertical resolution change has been accomplished with a minimum of parts, namely, a transistor and a pair of resistors and with minimum changes to the existing vertical ramp generating circuit.

It is recognized that numerous changes and modifications in the described circuit of the invention will be apparent to those skilled in the art without departing from its true spirit and scope. The invention is to be limited only as defined in the claims.

What is claimed is:

1. A monitor having at least two vertical display resolutions comprising:

horizontal deflection means and vertical deflection means;

means for receiving horizontal and vertical synchronizing signal information;

means for generating a mode signal indicative of the vertical display resolution from said horizontal and vertical synchronizing signal information;

oscillator means, including voltage means supplying operating voltage for said oscillator means and transistor switch means for changing said operating voltage by changing the loading on said voltage means responsive to said mode signal, for processing said vertical synchronizing signal information to develop a vertical ramp signal, the magnitude of which is dependent upon said mode signal;

means for coupling said vertical signal to said vertical deflection means; and means for changing said vertical signal in response to said mode signal.

2. The monitor of claim 1 wherein said generating means comprises a decoder for developing horizontal sync pulses, vertical sync pulses and said mode signal from said horizontal and vertical synchronizing signal information; and wherein said oscillator means is coupled to said decoder.

3. A monitor having two operating modes characterized by two different vertical display resolutions comprising:

horizontal deflection means and vertical deflection means;

means for receiving horizontal and vertical synchronizing signal information;

decoder means coupled to said receiving means for developing horizontal and vertical sync signals for said monitor and a mode signal indicative of the polarities of said horizontal and vertical synchronizing signal information;

oscillator means coupled to receive said vertical sync pulses for developing a vertical ramp signal;

means, coupled to said oscillator means, for changing the amplitude of said vertical ramp signal in response to said mode signal; and means for coupling said vertical ramp signal to said vertical deflection means;

said oscillator means including voltage means for supplying operating voltage for said oscillator means and said changing means comprising a transistor switch means coupled to said voltage supply means for loading said voltage supply means to reduce said operating voltage as a function of said mode signal.

4. The monitor of claim 3 wherein said oscillator means include voltage means for supplying operating voltage for said oscillator means and wherein said changing means comprise a transistor switch means coupled to said voltage supply means for loading said voltage supply means to reduce said operating voltage as a function of said mode signal.

* * * * *